June 14, 1966   J. GARRAFFA   3,255,791
METHOD OF PROFILING AND APPARATUS THEREFOR
Filed Sept. 26, 1963   8 Sheets-Sheet 1

INVENTOR
Joseph Garraffa
BY *Clive H. Bramson*
ATTORNEY

June 14, 1966  J. GARRAFFA  3,255,791
METHOD OF PROFILING AND APPARATUS THEREFOR
Filed Sept. 26, 1963  8 Sheets-Sheet 3

INVENTOR
Joseph Garraffa

BY *Clive H. Bramson*

ATTORNEY

June 14, 1966  J. GARRAFFA  3,255,791
METHOD OF PROFILING AND APPARATUS THEREFOR
Filed Sept. 26, 1963  8 Sheets-Sheet 5

INVENTOR
Joseph Garraffa

BY *Clive H. Bramson*

ATTORNEY

June 14, 1966  J. GARRAFFA  3,255,791
METHOD OF PROFILING AND APPARATUS THEREFOR
Filed Sept. 26, 1963  8 Sheets-Sheet 6

INVENTOR
Joseph Garraffa
BY Clive H. Bramson
ATTORNEY

June 14, 1966      J. GARRAFFA      3,255,791
METHOD OF PROFILING AND APPARATUS THEREFOR
Filed Sept. 26, 1963      8 Sheets-Sheet 7

INVENTOR
Joseph Garraffa
BY Clive H. Bramson
ATTORNEY

June 14, 1966  J. GARRAFFA  3,255,791
METHOD OF PROFILING AND APPARATUS THEREFOR
Filed Sept. 26, 1963  8 Sheets-Sheet 8

INVENTOR
Joseph Garraffa

BY Clive H. Bramson
ATTORNEY

United States Patent Office 3,255,791
Patented June 14, 1966

3,255,791
METHOD OF PROFILING AND APPARATUS THEREFOR
Joseph Garraffa, East Islip, N.Y., assignor of twelve and one-half percent to Clive H. Bramson, Oyster Bay, N.Y.
Filed Sept. 26, 1963, Ser. No. 311,812
15 Claims. (Cl. 144—325)

This invention relates generally to the art of profile reproduction and more particularly to a method and apparatus adapted to the end of enabling the pantographing of three-dimensional forms incapable of concentric mounting with respect to a single axis of rotation.

As an article of manufature exemplary of the eccentric characteristic, a tobacco smoking pipe will be referred to hereinbelow in disclosing the theory, mode of operation and structure characterizing the instant invention. It will, however, be appreciated that the reproduction of articles other than smoking pipes lies within the purview and contemplation of this invention, the apparatus and method described herein being applicable, as well, to many other articles of varying function, shape and form.

Consonant with the foregoing the instant invention has for an object the provision of a method enabling the reproduction of eccentrically rotating tracer forms.

Another object of the present invention resides in the provision of an apparatus adapted to facilitate the application of a novel method for reproducing three-dimensional forms.

A further object of this invention is to provide a device capable of eliminating the eccentricity in a rotating form with respect to a cutting member in combination therewith.

Another object of the instant invention resides in the provision of a three-dimensional shape profiling apparatus adapted to reproduce the bowl and shank of a smoking pipe as an integral unit.

A still further object of this invention is to provide a machine capable of simultanueously producing a plurality of smoking pipes using the three-dimensional pantographing method as disclosed herein.

Other general objects of the present invention reside in the provision of a machine of the foregoing general character, which is substantially automatic in its operation, which operates rapidly and economically to produce a variety of selected shapes and which for the work accomplished thereby is relatively simple of construction and requires but slight attention.

The accompanying drawings referred to herein and constituting a part hereof, illustrate preferred embodiments of the invention, and together with the description, serve to explain the principles of the invention.

Figure 1:
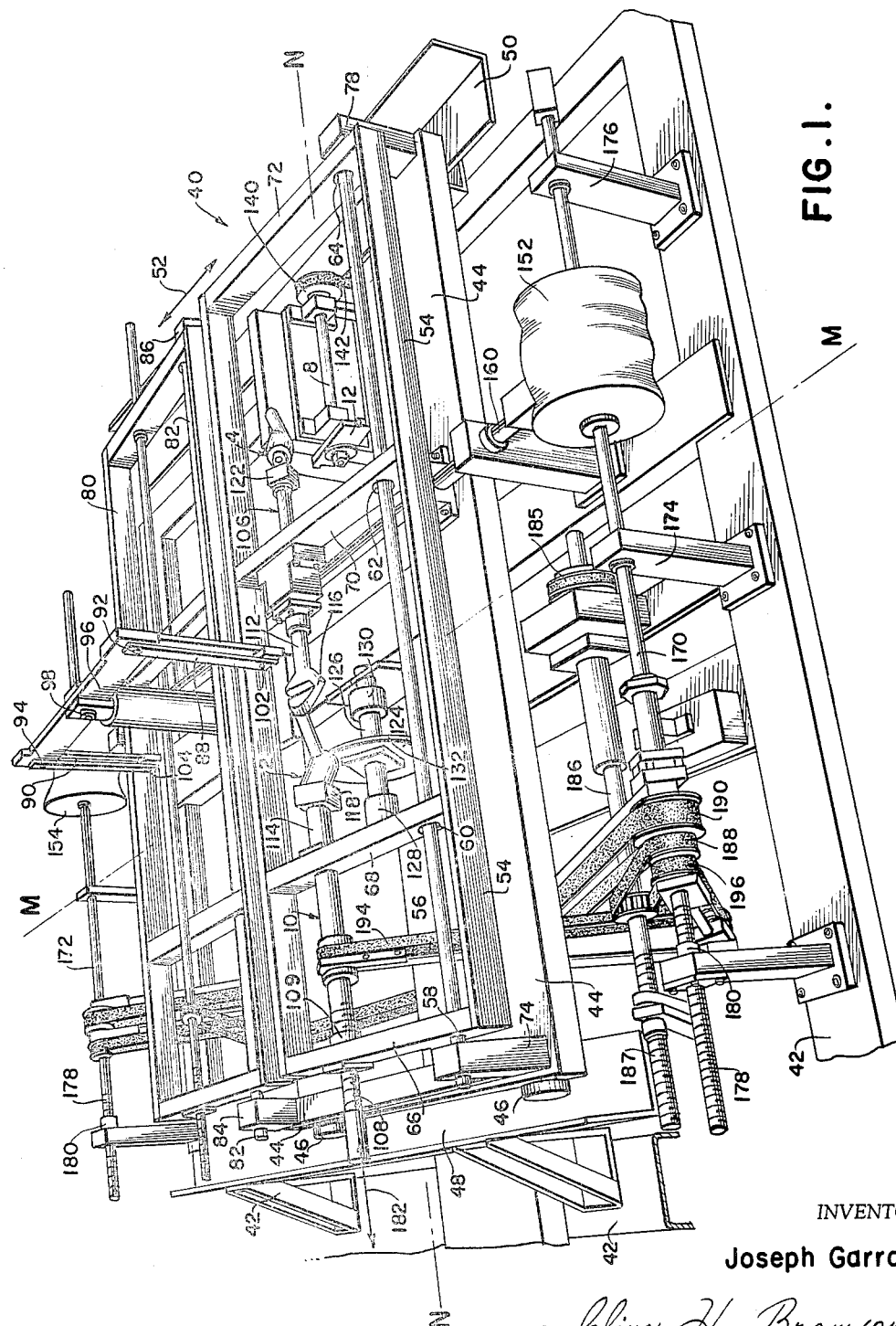
FIGURE 1 is a perspective view of a preferred embodiment of the three-dimensional form profiling apparatus according to the present invention.
Figure 2:
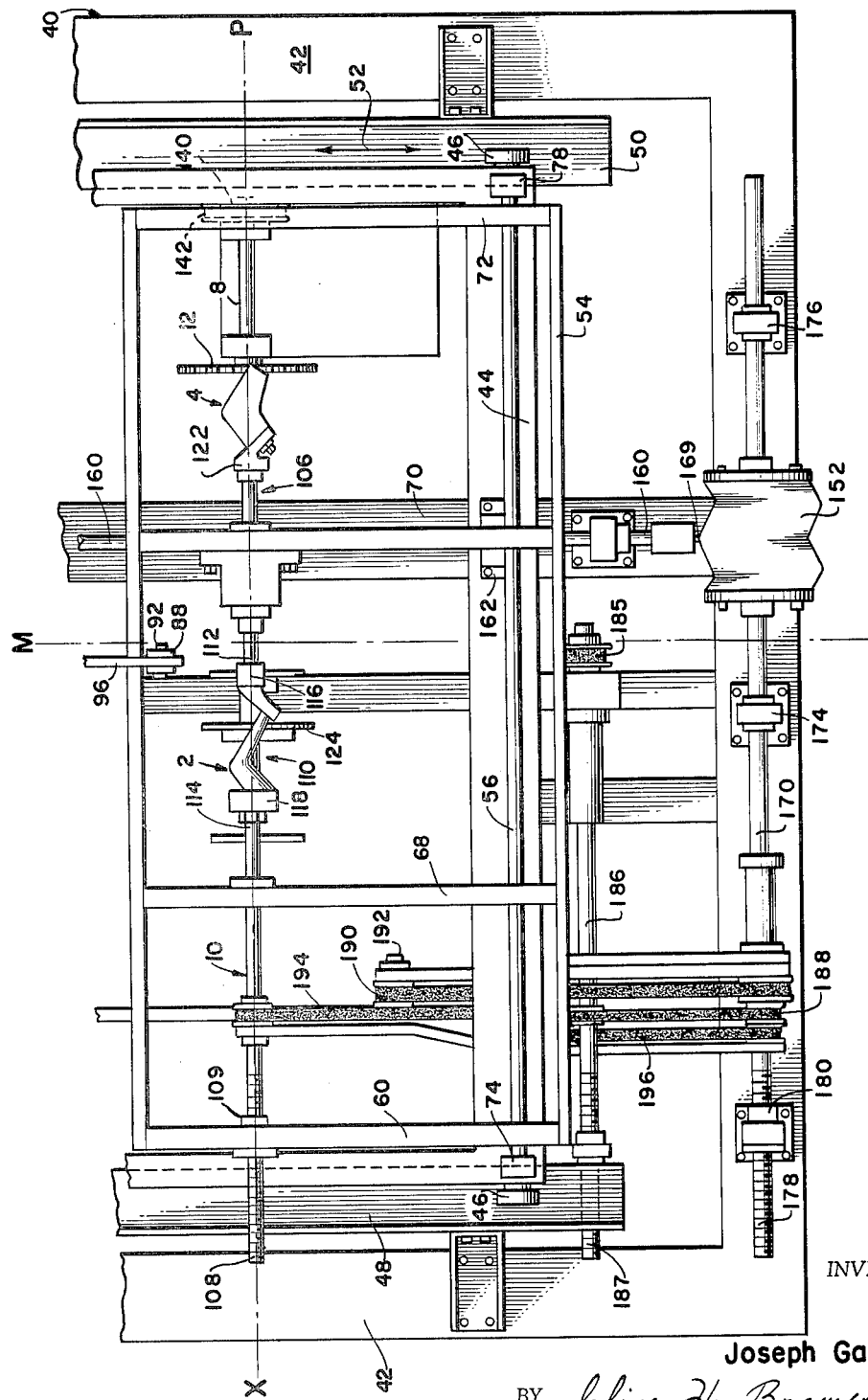
FIGURE 2 is a fragmentary top plan view of the apparatus shown in FIGURE 1.
Figure 3:
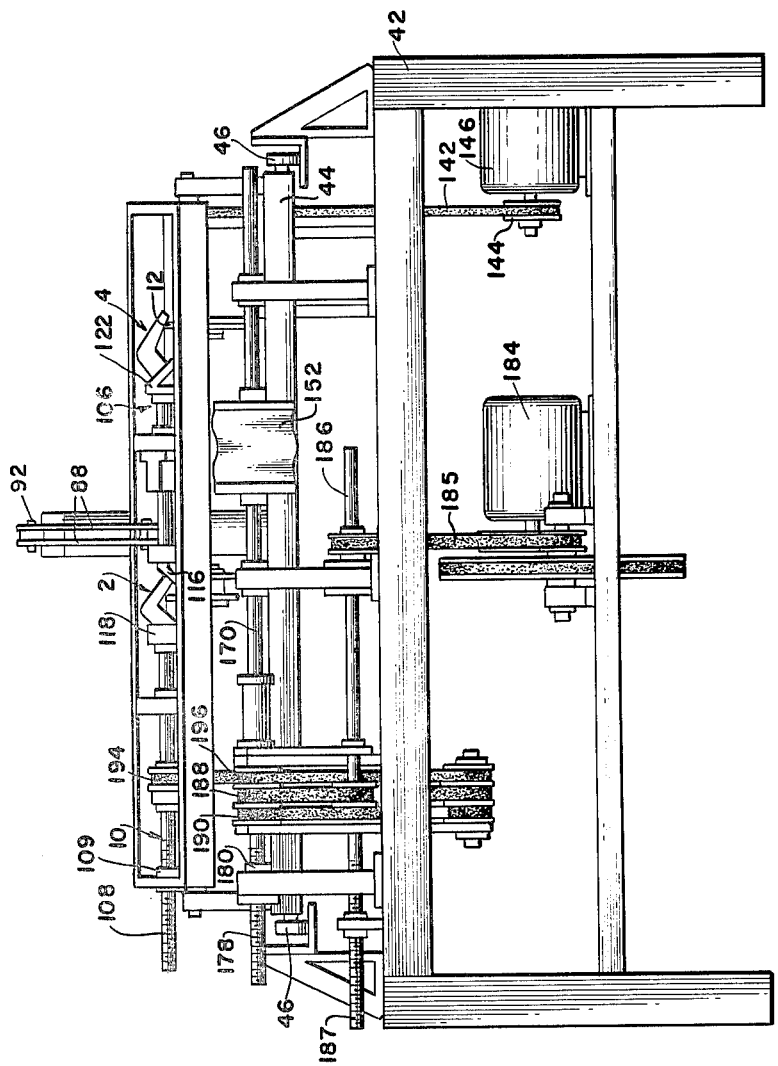
FIGURE 3 is an end elevational view thereof.

Essentially the present invention is directed to providing a method enabling the pantographing of a three-dimensional tracer form such as the tobacco smoking pipe form 2 shown in FIGURE 1 of the drawings, by rotating said form and a work-blank 4 on a common rotatable spindle, generally designated by numeral 10, and moving said spindle, tracer form and work-blank laterally and vertically with respect to the rotational axis P—P of rotatable cutter 12 to thus reproduce the configuration of said tracer form on said work-blank by the cutting action of said cutter 12 as said work-blank is brought into cutting engagement with the apex cutting point 18 thereof. Among the suitable types of cutting tools utilizable herein, cutter 12 may e.g., be of elongate configuration with cutting projections at the longitudinal ends thereof as shown in FIGURE 1 or of circular saw type as shown in FIGURE 2. To the end of maintaining that surface portion of the work-blank corresponding to the surface region of the tracer form desired to be reproduced, in cutting engagement with apex cutting point 18 of said cutter 12, resides the crux of the present teaching, the difficulty of such achievement being predicated upon the eccentricity of the tracer form with respect to the spindle with which it rotates, and the ellipticity of typical transverse sections of said tracer form, both factors requiring obviation to permit surface regions of said work-blank to engage the apex cutting point 18 in correspondence with surface regions of said tracer form rotating with said work-blank. To eliminate the eccentricity of rotation of the tracer form and hence eliminate the eccentricity of the work-blank which rotates in fixed, spaced relation therewith to thus maintain the centroid A of any given transverse section 14 of the tracer form (see FIGURE 11), in alignment with the vertical axis Z—Z of the rotatable cutter, spindle 10 is continually moved laterally and vertically with respect to said axis Z—Z, said movement being governed in accordance with principles to be described herein. It will be further appreciated that inasmuch as each elliptical transverse section, typified by aforesaid section 14, includes infinite radii R of various dimensions, vertical movement of the elliptical tracer form section functions to maintain the corresponding work-blank surface portion in cutting engagement with apex cutting point 18 whereby the elliptical section of the tracer form will be faithfully reproduced on said work-blank.

Figure 11:
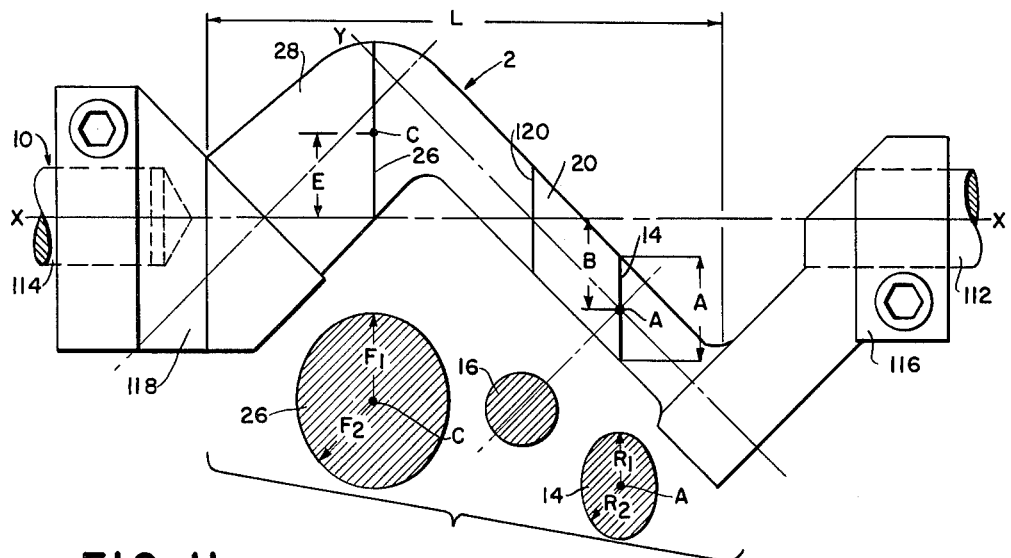
FIGURE 11 is an enlarged side elevational view of a smoking pipe tracer form mounted within the split section of a spindle (partially shown) and sections of the shank of said tracer form taken normally and angularly with respect to the longitudinal axis of said shank.

Thus, with reference now to FIGURE 11 of the drawings, where tracer form 2 is mounted angularly with respect to axis of rotation X—X of spindle 10, it will be appreciated that any typical transverse section thereof, such as section 14, will be elliptical when taken in a plane normal with respect to said axis X—X. As represented by section 16 of the same figure, it will be obvious that a typical section taken normally with respect to the longitudinal axis Y—Y of the tracer form will be circular as shown. Of course, it will be understood, that where cross-section 16 is not circular or only partially circular, cross-section 14 may be only partially elliptical. The particular cross-sectional configuration or the consistency or not thereof, is, however, of small consequence inasmuch as the method and apparatus disclosed herein readily compensate for such irregularities of cross-section.

Therefore, in exploiting the simplicity and efficiency of the method of profiling taught by this invention, a rotating cutter blade is utilized, the axis of rotation of which is, throughout the pantographing operation, maintained at a fixed location, the elimination of the eccentricity of a tracer form during rotation thereof about a rotating spindle upon which the form is secured being accomplished by continually repositioning the rotational axis of the spindle to thus maintain the center of any given transverse section of the eccentrically mounted tracer form in alignment with the vertical axis of the rotating cutter and to further maintain the corresponding surface region of the work-blank in cutting engagement with the apex cutting point of the rotatable cutter.

Figure 12:
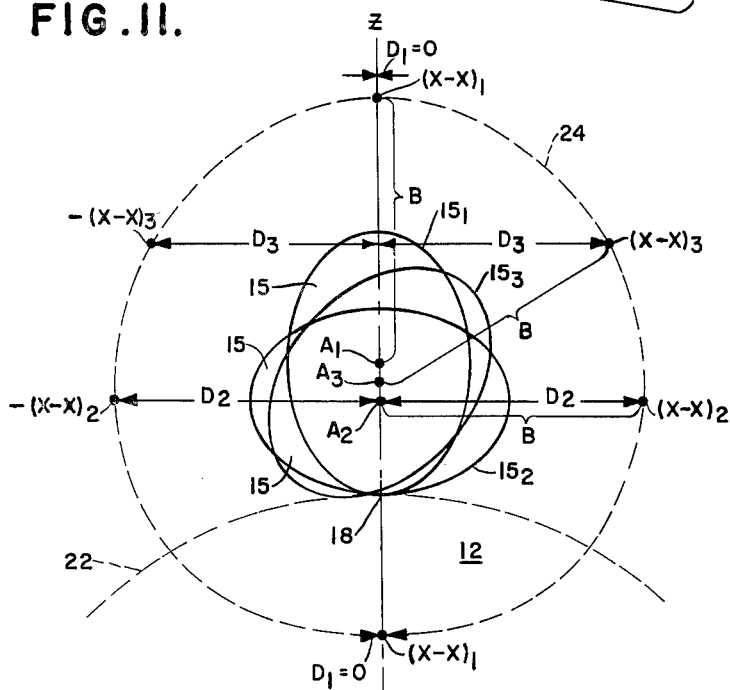
FIGURE 12 is a diagrammatical view illustrating the locus traversed by the longitudinal axis of the spindle with respect to the vertical axis of the rotatable cutter where said spindle is caused to rotate about the centroid of an elliptical section of a tracer form, where said centroid is maintained in alignment with said vertical axis of said rotatable cutter.

More specifically, the path or locus of points through which the rotational axis X—X of spindle 10 must be caused to follow to achieve the above-described desideratum will be clearly understood with reference to FIGURE 12 of the drawings. Therein, an elliptical transverse cross-section 15, produced on work-blank 4, (see FIGURE 1), corresponds similarly in shape to the elliptical cross-section 14 of tracer form 2 (see FIGURE 11). Said cross-section 15, as illustrated in FIGURE 12, represents the cross-section of a portion of shank 20 of the completed pipe which is similar in configuration to cross-section 14 of tracer form 2. As section 15 is rotated with spindle 10, axis X—X of spindle 10 being fixedly spaced the distance B with respect to centroid A of the section, said section assumes various positions, e.g., $15_1$, $15_2$ and $15_3$ as shown, thereby permitting the peripheral surface thereof to engage the apex cutting point 18 of cutter 12 which when rotating, generates a circle partially designated as broken line 22. Inasmuch as points $A_1$, $A_2$ and $A_3$, representing the location of centroid A at three exemplary positions of section 15, respectively, are, as shown, maintained in alignment with vertical axis Z—Z of said cutter; spindle 10, and more particularly axis X—X thereof, as it rotates, will generate an elliptical orbit 24, $(X—X)_1$, $(X—X)_2$ and $(X—X)_3$ being illustrative of exemplary positions of said axis X—X with respect to axis Z—Z as the former rotates with respect to the latter. That is, although $(X—X)_1$, $(X—X)_2$ and $(X—X)_3$ are equally distant with respect to centroids $A_1$, $A_2$ and $A_3$, respectively, the elliptical orbit 24 is generated by virtue of the rise and fall of said centroid A with respect to axis Z—Z. In order to maintain the centroid in such alignment, and thus progressive regions lying on the peripheral surface of the section being pantographed in cutting engagement with apex cutting point 18, it will be understood that spindle 10 must be oscillated vertically and laterally with respect to axis Z—Z, such oscillatory movement being manifestly to maintain axis X—X in the orbit 24 for the given transverse section 15 being pantographed. Conversely, were section 15 permitted to rotate or orbit about a laterally and vertical fixed but rotating axis X—X, it will now be readily observed that the work-blank would contact the apex cutting point 18 only once during an orbit, i.e., at the bottom of the orbit, the reproduction of the corresponding section 14 of the tracer form being unachieved in view of this non-obviated eccentricity of the work-blank.

Accordingly, axis X—X must be laterally moved through predetermined distances to maintain centroid A in alignment with axis Z—Z at all times. Thus, e.g., to position the section 15 at $15_1$, axis X—X which originates its orbit 24 in alignment with axis Z—Z, need not be moved inasmuch as its distance D, from axis Z—Z is zero. When section 15 occupies position $15_2$, however, axis X—X must be moved laterally the distance $D_2$ in order to maintain centroid A at position $A_2$; when section 15 occupies position $15_3$, axis X—X must be moved laterally the distance $D_3$ in order to maintain centroid A at position $A_3$. Negative distances $—D_2$ and $—D_3$ are exemplary of lateral movements requiring effectuation when axis X—X is orbiting on the left side of axis Z—Z. These distances must be evaluated for each point to be occupied by axis X—X during orbit 24 and may be determined descriptively as shown in FIGURE 12 of the drawings or by any other suitable method. As previously stated, axis X—X must be oscillated vertically, as well, with respect to axis Z—Z of the rotatable cutter 12 to reproduce the ellipticity of transverse section 14 on the newly formed section 15, such vertical movement being required to compensate for hte radii $R_1$, $R_2$, etc., variations in the elliptical section.

Figure 8:
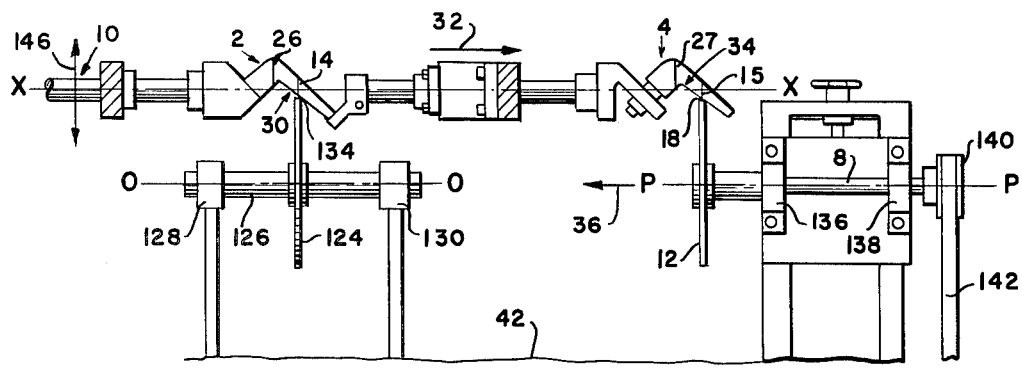
FIGURE 8 is a fragmentary transverse view of the rotatable spindle having the tracer form mounted angularly thereon and the rotatable cutter positioned with respect to the work-blank, the latter being secured upon said rotatable spindle.

To reproduce elliptical transverse section 26 of said tracer form 2 shown in FIGURE 11 of the drawings, as corresponding elliptical transverse section 27 on work-blank 4 as illustrated in FIGURE 8 of the drawings, centroid C of said section must, as aforedescribed with respect to section 14, be maintained in alignment with said axis Z—Z of rotatable cutter 12, the axis X—X, a fixed distance E with respect to centroid C, being moved laterally to maintain such alignment and vertically to reproduce the variations in radii $F_1$, $F_2$, etc., of said elliptical section.

To reproduce the complete tracer form 2 which includes said shank portion 20 and bowl portion 28, each transverse section taken individually and across the entire length L thereof must be reproduced in accordance with the method set forth hereinabove. Obviously, therefore, the greater the number of such sections so reproduced, the more faithful the pantographed work-blank produced. Thus, for example, to reproduce the entire area 30 lying between sections 14 and 26 of said tracer form 2 upon said work-blank 4, said tracer form, work-blank and spindle 10 must, in unison, be moved in the direction of arrow 32 while rotatable cutter 12 remains fixedly positioned. Accordingly, as such movement is accomplished and where axis X—X of said spindle is caused to follow an appropriate orbit for each transverse section lying between sections 14 and 26 and inclusive of said latter sections, area 30 will be reproduced as area 34 upon said work-blank 4. It will, however, be appreciated that should it become desirable to rotate spindle 10 while in a fixed position, rotatable cutter 12 may be moved in the direction of arrow 36 to accomplish the same result, provided, of course, said spindle is oscillated vertically and laterally according to the requirements as aforedescribed with respect to sections 14, 26 and the sections lying therebetween.

To the end of effectuating the principles of the method of pantographing as hereinabove set forth, a preferred apparatus as disclosed in the accompanying drawings will now be described, it being understood that the instant apparatus is exemplary of a means of carrying out said method, other structural embodiments capable of doing so to be considered as falling within the contemplation of this invention.

A general understanding of the arrangement and location of the parts of the novel apparatus may be had by reference to FIGURES 1 and 2 wherein the preferred profiling machine is designated generally by numeral 40, and to FIGURES 3–6 wherein a modification of the same machine is illustrated.

The apparatus, it will be observed, includes stationary chassis 42 having longitudinal and transverse axes M—M and N—N, respectively, and carriage 44 having rollers 46 connected to said carriage at opposite sides thereof, said rollers being supported upon angle-tracks 48, 50 of said chassis thereby rendering said carriage movable with respect to said chassis and in a direction parallel to the longitudinal axis thereof as designated by arrow 52. A rocker frame structure 54 is mounted above said carriage and is pivotable with respect thereto by dint of axle 56 which extends through sleeve-passages 58, 60, 62 and 64 provided within framework members 66, 68, 70 and 72 of said carriage, said axle 56 being supported at either end by stanchions 74 and 78, respectively, and thus maintained in parallelism with respect to the transverse axis of said chassis. Rocker frame structure 80 positioned adjacently of rocker frame structure 54 is pivotally supported in a manner similar to the later, axle 82 being supported by stanchions 84 and 86 as shown. Vertical linkages 88 and 90 pivotally connected at 92 and 94 to horizontal linkage 96, the latter being pivotally supported at fulcrum 98 provided at the pinnacle of stanchion 99 fixed at its base 100 to said carriage, and pivotal connections 102 and 104 to said respective rocker arm structures permit one said rocker frame structure to counterbalance the other in the course of the vertical pivotal oscillatory movement to be described hereinbelow following.

Split spindle 10 which is rotatably journalled transversely of rocker frame structure 54 and supported by said framework members 66, 68 and 70 thereof, includes free end 106 disposed inwardly of framework member 72, the latter forming one side of said rocker frame structure, threaded portion 108 at the other end, said threaded portion being threadedly supported within threaded collar 109 secured to framework member 66, and split section 110 which includes a pair of ends 112, 114 disposed in spaced opposing relation; said free end, threaded portion and said split section being disposed in axial alignment as shown in the drawings.

Aforesaid tracer form 2, which for the purpose of illustration is of the shape of a tobacco smoking pipe to be reproduced, is securable within split section 110 of said spindle to tracer form securing means composed of opposing mandrels 116 and 118 secured to ends 112 and 114, respectively, of said split section. With reference again to FIGURE 11 of the drawings, it will be observed that portions of said tracer form, e.g., transverse sections 14 and 26, are eccentric with respect to the axis X—X of rotation of said spindle, transverse section 120 being the only portion of said tracer form concentric with respect to said axis of rotation.

Work-blank-supporting-mandrel 122 secured to said free end 106 of said spindle provides the means whereto work-blank 4 is securable, said work-blank being of wood, preferably briar, where as in the instant example, a smoking pipe is to be formed therefrom. Where articles other than smoking pipes are to be pantographed utilizing the present apparatus, cutting means as described hereinbelow, will be suitably employed to the end of cutting the material of which the work-blank consists.

A rotatable stylus wheel 124 mounted on freely rotating axle 126, which is journalled within bearing members 128 and 130, the latter being secured to stationary chassis 42 is, as shown, disposed beneath the split section 110 of said spindle, the axis of rotation O—O of said stylus wheel (see FIGURE 8) being parallel spaced with respect to the longitudinal axis X—X of said spindle. Said stylus wheel, being "free wheeling" will rotate as the spindle is rotated inasmuch as the tracer form secured within the split section of said spindle is adapted to continually contact the peripheral edge 132 of said stylus wheel and more particularly the apex contact point 134 thereof as will be understood from the preceding discussion taken in conjunction with the following disclosure.

Rotatable cutter 12 supported by and secured to a stationary chassis 42 is connected to one end of axle 8, the latter being journalled within bearings 136 and 138. Pulley 140 is connected to the other end of said axle, continuous belt 142 being drivingly connected to said pulley from pulley 144 of electric motor 146 which, when energized, will impart rotational motion to said rotatable cutter. With reference to FIGURE 8 it will be seen that the axis of rotation P—P of said cutter is parallel spaced with respect to the longitudinal axis X—X of said spindle and further that said work-blank 4, when secured to mandrel 122, is adapted to contact the cutter 12 and more particularly said cutter as the latter traverses apex cutting point 18 during the course of its orbital movement 22 (see FIGURE 12). Axes O—O and P—P of stylus wheel 124 and rotatable cutter 12, respectively, are, as seen in FIGURES 2 and 8, axially aligned whereby the apex contact and cutting points 134 and 18, respectively thereof, lie in a common vertical plane, said plane being inclusive of vertical axis Z—Z designated in FIGURE 12 of the drawings.

In the present illustration, spindle 10, when rotated, will move in the direction of arrow 32 or in the reverse direction thereof when rotated in the opposite angular direction, such movement being effectuated by reason of the coaction between aforesaid threaded portion 108 and threaded collar 109. Where, as disclosed, movement of said spindle in a direction parallel to transverse axis N—N of said stationary chassis is so provided, the positions of said stylus wheel and rotatable cutter remain fixed with respect to said stationary chassis. It will, however, be appreciated that the pantographing operation according to the method hereinabove disclosed and as carried out with the preferred apparatus as herein described, may be accomplished where the spindle is stationary and rather the stylus wheel and cutter move in a direction parallel to said transverse axis N—N as designated by arrow 36 or in a direction opposite to said arrow.

Accordingly and in consonance with the structure described thus far, it will be understood that as spindle 10 is caused to rotate, tracer form 2 secured within split section 110 thereof will, at continually changing points of its surface, contact the peripheral edge 124 of said stylus wheel, causing the latter to rotate. The axis of rotation X—X of said spindle will oscillate in the vertical direction designated by arrow 146 (see FIGURES 7 and 8), the magnitude of such movement depending upon the degree of eccentricity of that portion of the tracer form resting upon the stylus wheel, said eccentricity being considered with respect to axis X—X. Such vertical oscillation, it will be understood, is further a function of the ellipticity of the tracer form transverse section, e.g., sections 14 and 26, revolving over the peripheral edge of said stylus wheel. It will be further appreciated that the aforesaid vertical oscillation of said spindle is occasioned by the pivotal action of said rocker frame structure with respect to said carriage as above-described. To maintain that portion of the tracer form resting upon the stylus wheel contiguous with the apex contact point 134 of the latter, the spindle must be oscillated laterally in the direction of arrow 148 to thus maintain the centroid of any transverse section, e.g., 14, in alignment with vertical axis Q—Q of said stylus wheel 124 (see FIGURE 7). It will, therefore, be understood that maintenance of the centroid S of transverse section 14, for example, of said tracer form in alignment with the vertical axis Q—Q of said stylus wheel, will maintain the centroid A of the corresponding transverse section 15 being pantographed on work-blank 4 in alignment with vertical axis Z—Z of rotatable cutter 12, such effect being occasioned by virtue of the rigid, spaced relation of said stylus wheel and work-blank along common longitudinal axis X—X.

To the end of maintaining the centroid of any given tracer form section being pantographed in alignment with vertical axis Q—Q of said stylus wheel 124 and thus in alignment with apex contact point 134, said carriage, rocker frame structure and spindle, as aforementioned, are oscillated laterally in the direction of arrows 148 and 150, such oscillation being relative to said stationary chassis and being effectuated during the rotation of said spindle.

To accomplish such lateral oscillation, a pair of identical, elongated cams 152, 154 positioned at opposite ends 156 and 158, respectively, of said stationary chassis, function to oscillate cam-follower-shaft 160 therebetween. Said cam-follower-shaft being fixedly secured to said carriage at connecting blocks 162 and 164 will impart its oscillatory movement to said carriage and hence to the rocker frame structure 54 and spindle 10 integral therewith.

Figures 9, 10:
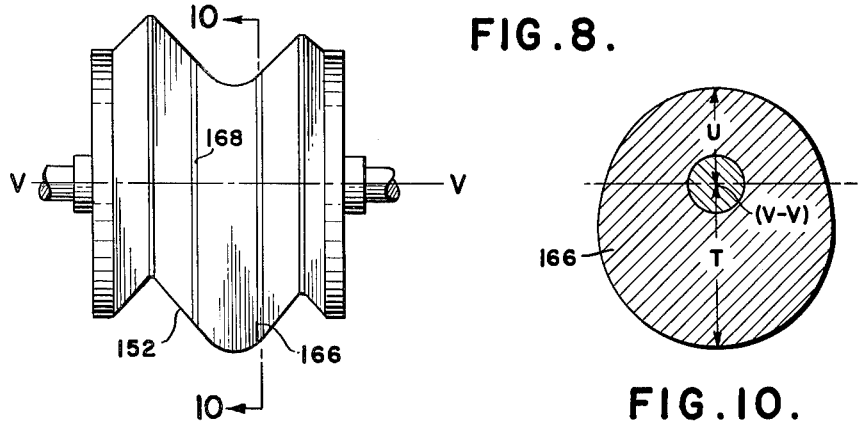
FIGURE 9 is a side elevational view of a cam utilized with the instant apparatus.
FIGURE 10 is a typical elliptical cross-section of the cam taken along the line 10—10 of FIGURE 10.

The duty of said cams being to oscillate axis X—X of said spindle 10 predetermined distances with respect to vertical axes Q—Q and Z—Z of said stylus wheel and rotatable cutter, respectively, attention is now directed to FIGURES 9 and 10 of the drawings wherein an isolated elevational view of a typical cam and the cross-section of a single station 166 thereof are shown. Where said station 166 represents the station developed for effectuating movement of said spindle through orbit 24 shown in FIGURE 12 to thus maintain the centroid A of transverse elliptical section 15 in alignment at all times with said axis Z—Z, distances T and U, e.g., designated on said cam section, are correlated to move axis X—X through distances $D_2$ and $-D_2$ shown in FIGURE 12, or the maximum and minimum distances, respectively, reflecting the movements necessary to place said axis at $(X-X)_2$ and $-(X-X)_2$ during the course of its rotation, other continually varying distances such as $D_3$, $-D_3$, etc., being also predetermined by the varying distances from the center V—V of the cam section to the elliptical periphery thereof. Typical cam 152, as shown in FIGURE 9, includes stations developed for the many transverse sections, e.g., 168 for pantographing section 26 shown in FIGURE 11 and the other transverse sections comprising the tracer form. Accordingly, identical cams 152, 154 positioned similarly at either end of said stationary chassis function to oscillate said cam-follower-shaft 160 and hence said carriage and rotating spindle as aforedescribed. To facilitate such oscillation, wheel bearings 169 disposed at respective ends of said cam-follower-shaft, contact opposite surfaces of respective said identical elongated cams whereby rotation of said cams will effectuate ultimate lateral movement of said spindle. It will, however, be appreciated that any other suitable means may be employed to maintain the centroid of each transverse section being progressively pantographed, in alignment with the vertical axis of the rotating cutter. That is, other mechanical or electrical, electro-mechanical or hand manipulation of said spindle during the rotational motion thereof to effectuate the proper orbital movement thereof, fall within the contemplation of this invention as set forth in the disclosure of the method of three-dimensional pantographing disclosed herein.

Figure 4:
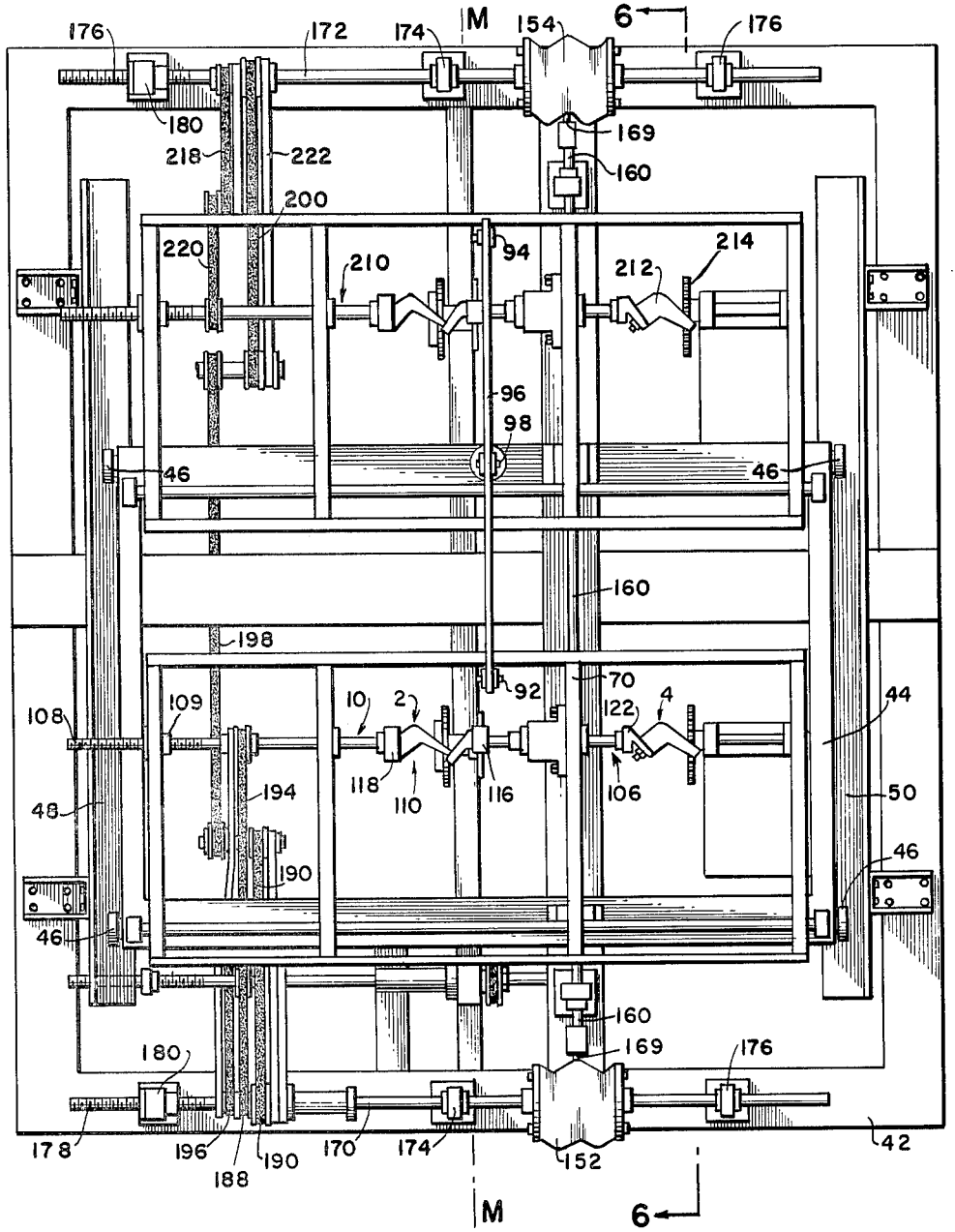
FIGURE 4 is a top plan view of an alternate embodiment of a machine according to the present invention wherein a plurality of forms may be concurrently reproduced.

Cam shafts 170 and 172 disposed in mutual parallelism and respectively positioned at opposing longitudinal ends 156 and 158 of said stationary chassis, axially support said cams 152 and 154 at identical positions as shown in FIGURE 4 of the drawings. Both said cams are similarly oriented and aligned with respect to the longitudinal axis M—M of said stationary chassis. Each cam-shaft rotatably and slidably secured within bushing support members 174, 176 and threaded portion 178 of each cam-shaft is threadedly associated with respective threaded collar member 180, said respective bushing support and threaded collar members being attached to said stationary chassis at respective longitudinal ends thereof.

Additionally, it will be appreciated that the threaded portions 158 and 178 of said spindle and cam-shaft, respectively, are identical and, therefore, concurrent, identical rotation thereof will occasion identical simultaneous movement of these members in a direction parallel to said transverse axis N—N of said stationary chassis or more particularly in either direction of arrow 182, depending upon the direction said members are rotated. Accordingly, then, simultaneous and identical rotation of said cams, tracer form and work-blank, will result in the identical movement of said members transversely of said cam-follower-shaft, stylus wheel and rotatable cutter, respectively. This transverse movement will, therefore, enable the reproduction of the entire length L of said tracer form as the length of the work-blank is progressively moved into cutting engagement with the fixedly positioned rotating cutter, such cutting engagement being in accordance with the combined dictates of the vertically and laterally moving rotating spindle; that is, the vertical movement occasioned by the rising and falling of the rocker-frame structure as the tracer form rotates while supported by said stylus wheel, and the lateral motion due to the coaction of the cams, cam-follower-shaft and carriage to the end of maintaining the desired changing orbital paths of axis X—X of said rotating spindle.

Figure 5:
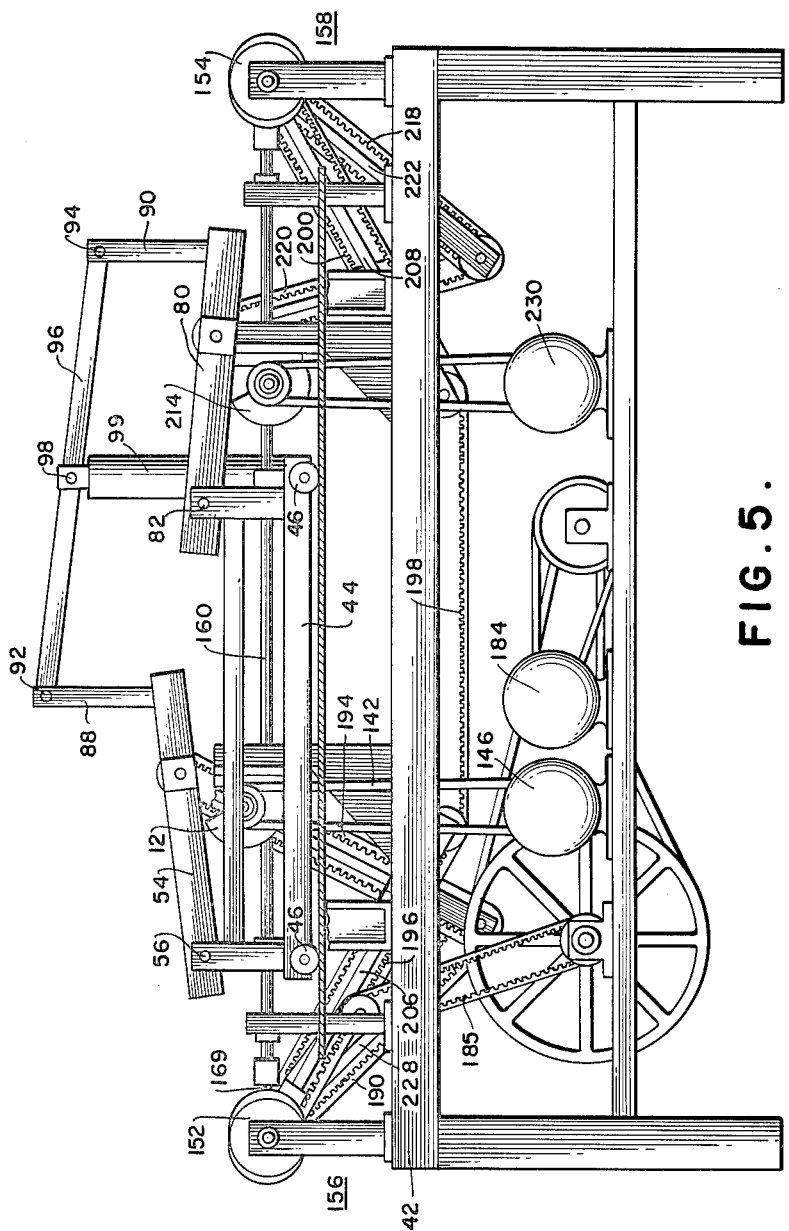
FIGURE 5 is a side elevation view of the machine illustrated in FIGURE 4.
Figure 6:
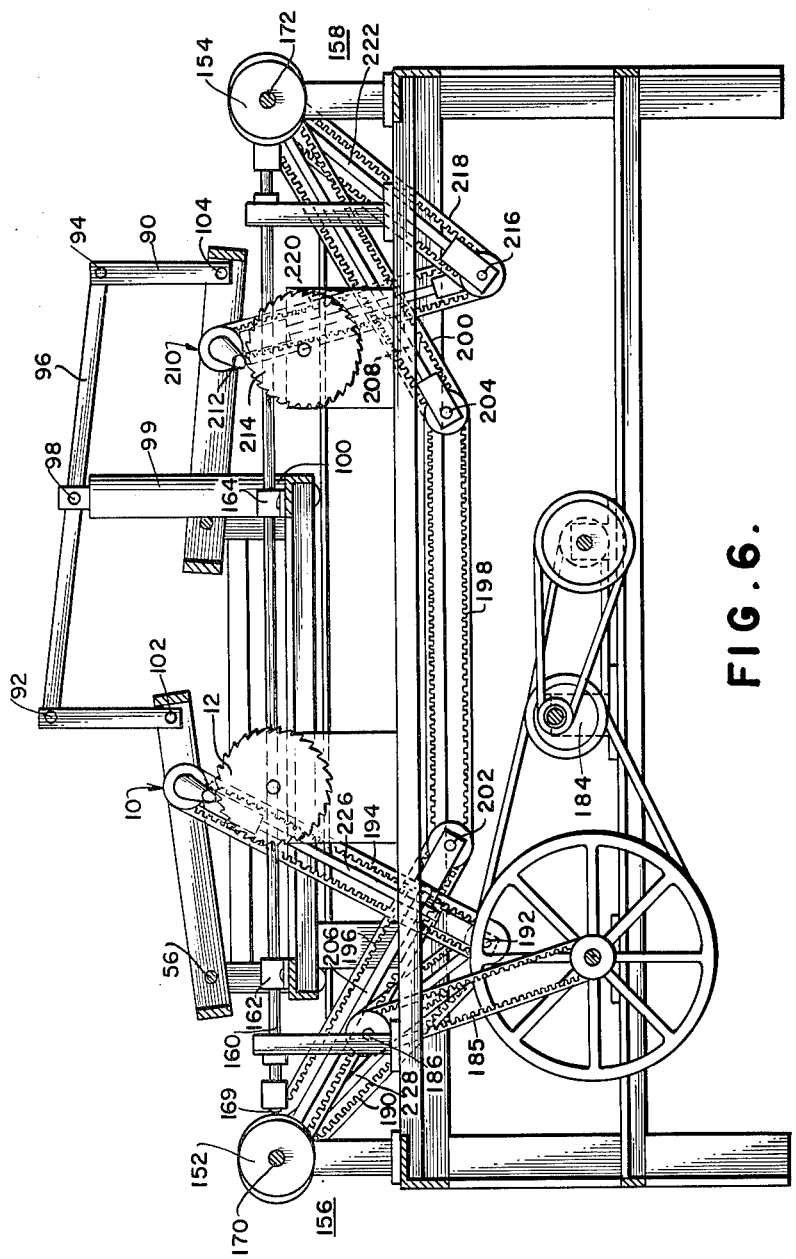
FIGURE 6 is a cross-sectional view of the instant apparatus taken along line 6—6 of FIGURE 4.
Figure 7:
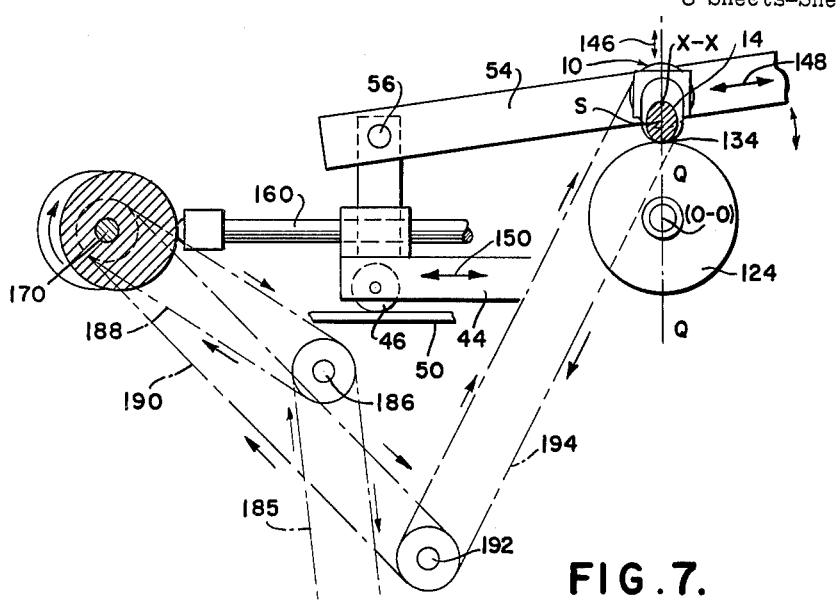
FIGURE 7 is an enlarged fragmentary view of the apparatus illustrating the relationship between the movable carriage, cam-follower-shaft and rotatable spindle and the stationary platform, rotatable stylus linkage between the cam and rotatable spindle being shown therein.

To accomplish identical rotation of said members as aforedescribed, a single driving power source 184 is preferably utilized together with a continuous belt drive system flowing from the electric motor 184 through belt 185 to intermediate drives haft 186 and from thence to said cam shafts, and spindle, or spindles, where there be more than one pantographing operation occurring simultaneously as illustrated in the modified embodiment shown in FIGURES 4–6 of the drawings. Essentially, the basic connecting linkage is as shown in FIGURE 7, where intermedite drive shaft 186, when rotated by belt 185, through belt 188, rotates cam shaft 170 and from said cam shaft, belt 190 drives scissor shaft 192 from which belt 194 extends to rotate spindle 10. Shaft 186, it will be observed, when rotated, will move parallel to transverse axis N—N because of threaded portion 187 which is identical to threaded portions 178 and 108. By dint of the linkage afforded by scissor shaft 192 which functions to flexibly connect the driving force between said cam shaft and said spindle, carriage 44 is free to oscillate laterally in the directions of arrow 150 notwithstanding the uninterrupted rotation of spindle 10. Rotational motion identical to the motion imparted to said cam shaft 170 through belt 188 is thus imparted to cam shaft 172 through the undercarriage belt linkage as shown in FIGURE 6. That is, belts 196, 198 and 200, extending between cam shaft 170 and 172 through intermediary shafts 202 and 204, carry the identical rotational motion of cam shaft 170 to cam shaft 172. It will be observed that rigidity of said undercarriage linkage is maintained by brace bars 206 and 208 extending between respective cam shafts and intermediary shafts. Where as in the modified embodiment of FIGURES 4–6, plural pantographing operations are effectuated simultaneously, driving power is shown imparted to an additional spindle 210 wherein a second work-blank 212 is secured in cutting relation with respect to a second rotatable cutter 214. Scissor shaft 216 provides the flexible linkage between continuous belts 218 and 220 which extend rotational motion from cam shaft 172 to said scissor shaft 216 and from said scissor shaft 216 to said spindle 210. Brace bars 222 and 224 lend rigidity to the belts extending from the elbow action of scissor shaft 216 as do brace bars 226 and 228 for the aforesaid belts extending from the elbow action of scissor shaft 192. The import of the rigidity attribute will be seen to reside in the provision of taut belt drive linkages between cam shafts and spindles while precluding interference with the essential vertical and lateral oscillation of the spindle.

With particular reference to FIGURE 5 of the drawings, it will be seen that where more than a single pantographing operation is simultaneously accomplished, each rotatable cutter 12 and 214 is independently rotated by driving means 146 and 130, such arrangement being feasible in view of the absence of criticallity of the rotational velocity of said cutters. However, inasmuch as the movement of all shafts and spindles in the direction normal to longitudinal axis M—M of the stationary chassis must be uniform, an interconnected belt system, as aforedescribed, is utilized. Further, to assure such uniform transverse movement, each shaft and spindle, having an identically threaded portion, is rotated in the same angular direction and at any equivalent velocity. The lateral and vertical movement of the spindle is permitted notwithstanding the interconnected belt system by dint of the scissor linkages as described, which permit lateral movement of the carriage and vertical movement of the rocker frame structures during the rotation of said spindle.

Thus, as has been disclosed, a method for three-dimensional pantographing or profiling and an apparatus for effectuating said method has been disclosed. Inasmuch as changes may be made in carrying out the above method and apparatus, without departing from the scope of the invention, it is intended that all matter contained in the above description shall be interpreted as illustrative and exemplary and not in a limiting sense. Accordingly, such variations falling within the purview of this invention may be made while within the spirit of the invention and without sacrificing any of the attendant advantages thereof, provided, however, that such changes fall within the scope of the claims appended hereto.

What is claimed is:

1. In a profiling apparatus for pantographing three-dimensional shapes, the combination comprised of a stationary chassis platform having longitudinal and transverse axes; a carriage supported upon said chassis platform, a plurality of rollers connected to said carriage, said rollers rendering said carriage movable with respect to said stationary chassis and in a direction parallel to the longitudinal axis thereof; a rocker frame structure mounted upon said carriage, said rocker frame structure being pivotal about an axle supported by said carriage, said axle being parallel with respect to the transverse axis of said chassis; a split spindle rotatably journalled transversely of said rocker frame structure, said spindle having a free end, a threaded portion and a split section, said split section including a pair of ends disposed in spaced opposing relation, said free end being disposed inwardly of one side of said rocker frame structure, said threaded portion being threadedly supported within a threaded collar provided within said rocker frame structure, said free end, threaded portion and said split section being disposed in axial alignment; a rotatable stylus wheel secure to the stationary chassis, the axis of rotation of said stylus wheel being parallel spaced with respect to the longitudinal axis of said spindle, said stylus wheel being disposed beneath the split section of said spindle; a tracer form securable within the split section of said spindle, portions of said tracer form, when secured, being eccentric with respect to the axis of rotation of said spindle, said tracer form, when secured, being adapted to contact the peripheral edge of said stylus wheel; a work-blank-supporting-mandrel positioned at the free end of said spindle and said mandrel being adapted to support a work blank, a rotatable cutter secured to the stationary chassis, the axis of rotation of said cutter being parallel and spaced with respect to the longitudinal axis of said spindle, said work-blank, when secured to said mandrel, being adapted to contact said rotatable cutter; a pair of cam-shafts, a portion of each being threaded, each cam-shaft being rotatably and slidably secured within respective bushing support members and threadedly associated with respective threaded collar members, said bushing support members and threaded collar members being attached to said stationary chassis at respective longitudinal ends thereof, said cam-shafts being disposed in mutual parallelism and adapted for movement transversely of said stationary chassis in a direction normal with respect to the longitudinal axis thereof; the threaded portions of said cam-shafts and split spindle being identical to thus effectuate correspondence of movement, respectively thereamong, transversely of said carriage upon rotation of said cam-shafts and said split spindle; a pair of identical, elongated cams, each cam being coaxially secured to one cam-shaft, respectively, transverse cross-sections of said cams being elliptical of configuration; a cam-follower-shaft fixedly connected to said carriage, said cam-follower-shaft being disposed in parallelism with respect to the longitudinal axis of said stationary chassis, wheel bearings disposed at respective ends of said cam-follower-shaft, said wheel bearings being arranged to contact opposite surfaces of respective said identical, elongated cams whereby rotation of said cams will effectuate oscillatory movement of said carriage therebetween; first driving means and connecting means, said connecting means being intermediate said first driving means and said cam-shafts and said split spindle; said first driving and connecting means being arranged to cause identical and simultaneous angular rotation of said cam-shafts and said split spindle; and second driving means drivingly associated with said rotatable cutter.

2. In a profiling apparatus for pantographing three-dimensional shapes, the combination comprised of a stationary platform having longitudinal and transverse axes; a carriage supported upon said platform, said carriage being movable in a direction parallel to said longitudinal axis of said platform; a rocker frame structure pivotally mounted upon said carriage; a spindle rotatably journalled upon and transversely of said rocker frame structure; tracer form and work-blank securing means provided upon said spindle; a rotatable stylus wheel secured to the stationary platform and disposed beneath said tracer form securing means; a tracer form securable to said tracer form securing means, and when secured being adapted to contact the peripheral edge of said stylus wheel; a rotatable cutter mounted upon said stationary platform, the axis of rotation of said cutter being parallel with respect to the axis of rotation of said spindle; said work-blank securing means being adapted to hold a work-blank, the latter when secured to said securing means being adapted to contact said rotatable cutter, said work-blank securing means and said rotatable cutter being arranged for movement relative each other, said movement being parallel to the transverse axis of said stationary platform; at least one cam shaft rotatably mounted upon said stationary platform and disposed for movement parallel with respect to the transverse axis of said stationary platform; a cam coaxially secured to said at least one cam shaft; a cam-follower-shaft secured to said follower shaft secured to said carriage whereby movement of said cam-follower-shaft will occasion movement of said carriage with respect to said stationary platform, an end of said cam-follower-shaft being movably contiguous with respect to said cam whereby, when contiguous therewith, rotation of said cam will occasion such movement of said carriage; and driving means associated with said spindle, said at least one cam shaft and said rotatable cutter, said driving means being adapted to cause the rotation of said spindle, said at least one cam shaft and said rotatable cutter.

3. In a profiling apparatus for pantographing three dimensional shapes, the combination comprised of a platform; a carriage supported by said platform and movable with respect thereto; a spindle pivotally and rotatably mounted with respect to said carriage; tracer form and work-blank securing means provided upon said spindle; a rotatable stylus wheel secured to said platform; a tracer form securable to said tracer form securing means, and when secured thereto, being adapted to contact the peripheral edge of said stylus wheel; a rotatable cutter; said work-blank securing means being adapted to hold a work-blank, the latter when secured to said securing means, being adapted to contact said rotatable cutter, said work-blank securing means and said rotatable cutter being arranged for movement relative each other; at least one cam shaft rotatably mounted upon said platform and movable with respect thereto; a cam coaxially secured to said at least one cam shaft; a cam-follower-shaft secured to said carriage whereby movement of said cam-follower-shaft will occasion movement of said carriage with respect to said platform, an end of said cam-follower-shaft being adapted to contact said cam whereby when in contact therewith, rotation of said cam will occasion movement of said carriage with respect to said platform.

4. The method of pantographing a tracer form comprising the steps of eccentrically mounting the form upon a rotatable spindle, mounting a work-blank upon said spindle spacedly with respect to the tracer form, placing the work-blank in cutting relation with a rotatable cutter, rotating said spindle and rotatable cutter, and moving said spindle laterally and vertically with respect to the axis of rotation of said rotatable cutter to maintain the longitudinal axis of said tracer form in vertical alignment with respect to the axis of rotation of said rotatable cutter during the rotation of said spindle and to reproduce on the work-blank any variation of the radii of a cross-section of said tracer form.

5. In a profiling apparatus for pantographing smoking pipe shapes, the combination comprising a rotatable spindle, a tracer form mounted upon said spindle, the longitudinal axis of said tracer form being angularly disposed with respect to the longitudinal axis of said spindle, said spindle being adapted to support a work-blank, a stylus wheel, the peripheral edge thereof being adapted for continuous contact with respect to the surface of said tracer form, cutting means arranged in cutting relation with respect to said work-blank means for rotating said spindle, and means for moving said spindle laterally with respect to the concentric axis of said stylus wheel.

6. In a profiling apparatus for pantographing three-dimentonal shapes, the combinaiton comprised of a rotatable spindle, a tracer form mounted upon said spindle whereby the longitudinal axis of said tracer form is angularly disposed with respect to the longitudinal axis of said spindle, said spindle being adapted to support a work-blank, a stylus wheel, the peripheral edge thereof being adapted for continuous contact with respect to the surface of said tracer form, cutting means arranged in cutting relation with respect to said work-blank, means for rotating said spindle, means for moving said spindle laterally with respect to the concentric axis of said stylus wheel, and means for moving said spindle in a direction parallel with respect to said concentric axis.

7. In a profiling apparatus for pantographing three-dimensional shapes, the combination comprised of a rotatable spindle, a tracer form mounted upon said spindle, the longitudinal axis of said tracer form being angularly disposed with respect to the longitudinal axis of said spindle, said spindle being adapted to support a work-blank, rotatable cutting means arranged in cutting relation with respect to said work-blank, and means for moving said spindle laterally with respect to the axis of rotation of said cutting means.

8. In a profiling apparatus for pantographing three-dimensional shapes, the combination comprised of a rotatable spindle adapted to support a work-blank, a tracer form securable to said spindle, portions of the former being eccentric with respect to the longitudinal axis of the latter when secured thereto, rotatable cutting means arranged in cutting relation with said work-blank when secured to said spindle, and means for moving said spindle laterally with respect to the axis of rotation of said cutting means.

9. The method of pantographing a substantially cylindrical tracer form comprising the steps of mounting the form upon a spindle whereby the longitudinal axis of said form is angularly disposed with respect to the longitudinal axis of said spindle and whereby at least one transverse section taken through said form normally with respect to said axis of said spindle is substantially elliptical in configuration, mounting a work-blank upon said spindle, spacedly with respect to the tracer form, placing the work-blank in cutting relation with a rotatable cutter, rotating said spindle and rotatable cutter, moving said spindle laterally and in parallelism with respect to the axis of rotation of said rotatable cutter to maintain the center point of said transverse section in vertical alignment with respect to the axis of rotation of said rotatable cutter, and moving said spindle vertically and in parallelism with respect to the axis of rotation of said rotatable cutter to reproduce the ellipticity of said transverse section on the work-blank.

10. In a profiling apparatus for pantographing three-dimensional shapes, the combination comprised of a stationary platform having longitudinal and transverse axes; a carriage movably supported upon said platform, a plurality of rocker frame structures pivotally mounted upon said carriage, at least one spindle rotatably mounted transversely of each said rocker frame structure, tracer form and work-blank securing means provided upon each said spindle, respectively, rotatable cutters mounted upon said stationary platform, the axis of rotation of each said rotatable cutter being parallel with respect to the longitudinal axis of respective rotatable spindle; tracer forms securable to said tracer form securing means of said respective spindles; said work-blank securing means and said respective rotatable cutters being arranged for mutual relative movement, such movement being parallel to the transverse axis of said stationary platform; means for moving said spindles laterally with respect to the axis of rotation of respective rotatable cutters, and means for carrying the unsupported weight of said respective spindles and rocker arms to effectuate vertical movement of said spindles upon rotation thereof, and means for rotating said spindles.

11. In a profiling apparatus for pantographing three-dimensional shapes, the combination comprised of a rotatable spindle, a tracer form securable to said spindle, portions of the former being eccentric with respect to the longitudinal axis of the latter when secured thereto, rotatable cutting means arranged in cutting relation with a work-blank when the latter is secured to said spindle, first means for moving said spindle laterally with respect to the axis of rotation of said cutting means, and second means for moving said spindle vertically with respect to the axis of rotation of said cutting means.

12. In a profiling apparatus for pantographing three-dimensional shapes as set forth in claim 11, wherein said first means comprises a pair of rotatable cams respectively positioned on opposite sides of the longitudinal axis of said spindle, and a cam-follower-shaft disposed normally with respect to the axes of rotation of said cams, the ends of said cam-follower-shaft being contiguous with each said cam, respectively.

13. In a profiling apparatus for pantographing three-dimensional shapes as set forth in claim 11, wherein said second means comprises in combination, a pivotally arranged rocker arm rotatably journalling said spindle and a stylus wheel contiguous with said tracer form and adapted to carry the unsupported weight of said spindle and rocker arm.

14. The method of pantographing a substantially cylindrical tracer form comprising the steps of mounting the form upon a rotatable spindle whereby the longitudinal axis of said form is angularly disposed with respect to the longitudinal axis of said spindle and whereby at least one transverse section taken through said form normally with respect to said axis of said spindle is at least in part elliptical of configuration, mounting a work-blank upon said spindle spacedly with respect to the tracer form, placing the work-blank in cutting relation with a rotatable cutter, rotating said spindle and rotatable cutter, and moving said spindle laterally with respect to the axis of rotation of said rotatable cutter to maintain the center point of said transverse section in vertical alignment with respect to the axis of rotation of said rotatable cutter, and moving said spindle vertically with respect to the axis of rotation of said rotatable cutter to reproduce the ellipticity of said transverse section on the work-blank 15. In a profiling appartus for pantographing three-dimensional shapes, the combinaiton comprised of a tracer form, a rotatable spindle for holding said tracer form whereby the center of a transverse section of said tracer form is eccentric with respect to the rotational axis of said spindle, a rotatable stylus wheel in contact with said tracer form during the rotation of the latter while held by said spindle, said stylus wheel having a vertical axis, and means for maintaining said center of a transverse section of said tracer form in vertical alignment with the vertical axis of said stylus wheel during rotation of said spindle and tracer form.

References Cited by the Examiner

UNITED STATES PATENTS 2,828,783   4/1958   Eden et al. _____ 142—7

WILLIAM W. DYER, Jr., *Primary Examiner.*

W. D. BRAY, *Assistant Examiner.*